United States Patent
Franz et al.

(10) Patent No.: US 6,645,277 B1
(45) Date of Patent: Nov. 11, 2003

(54) FILTERING APPARATUS FOR FILTERING COMPRESSED AIR

(75) Inventors: Jochen Franz, Reutlingen (DE); Günter Gebauer, Esslingen (DE)

(73) Assignee: Festo AG & Co., Esslingen (DE)

( * ) Notice: Subject to any disclaimer, the term of this patent is extended or adjusted under 35 U.S.C. 154(b) by 34 days.

(21) Appl. No.: 09/857,532

(22) PCT Filed: Sep. 26, 2000

(86) PCT No.: PCT/EP00/09351

§ 371 (c)(1), (2), (4) Date: Jun. 6, 2001

(87) PCT Pub. No.: WO01/30483

PCT Pub. Date: May 3, 2001

(30) Foreign Application Priority Data

Oct. 28, 1999  (DE) .......................................... 199 51 961

(51) Int. Cl.[7] .............................................. B01D 35/14
(52) U.S. Cl. ............................. 96/417; 96/421; 96/422; 96/424; 55/DIG. 17; 210/85; 210/90
(58) Field of Search ...................... 55/DIG. 17; 96/417, 96/418, 419, 422, 423, 424; 210/85, 90, 91, 238, 456, 450, 451, 477, DIG. 14

(56) References Cited

U.S. PATENT DOCUMENTS

| 4,179,372 A | | 12/1979 | Rosaen |
| 4,259,097 A | * | 3/1981 | Patel et al. ............. 55/DIG. 17 |
| 4,721,563 A | | 1/1988 | Rosaen |
| 4,726,813 A | * | 2/1988 | Viscovich ..................... 55/396 |
| 4,851,018 A | * | 7/1989 | Lazzari et al. ............. 55/385.2 |
| 5,378,254 A | | 1/1995 | Maly et al. |
| 6,425,930 B1 | * | 7/2002 | Wake et al. ................ 55/385.3 |

FOREIGN PATENT DOCUMENTS

| HU | 208 380 A | 9/1993 |
| WO | WO 94/20784 | 9/1994 |

* cited by examiner

Primary Examiner—Duane Smith
Assistant Examiner—Minh-Chau T. Pham
(74) Attorney, Agent, or Firm—Hoffmann & Baron, LLP

(57) ABSTRACT

A filter device for the filtration of compressed air, which is provided with a filter means (6) able to be deinstalled for cleaning and/or renewal purposes. Furthermore there is a detection means (52) which renders possible detection of the filter means (6) and which is able to produce an electrical detect signal dependent on the result of a detection operation, such signal being able to be employed for suitable purposes.

24 Claims, 4 Drawing Sheets

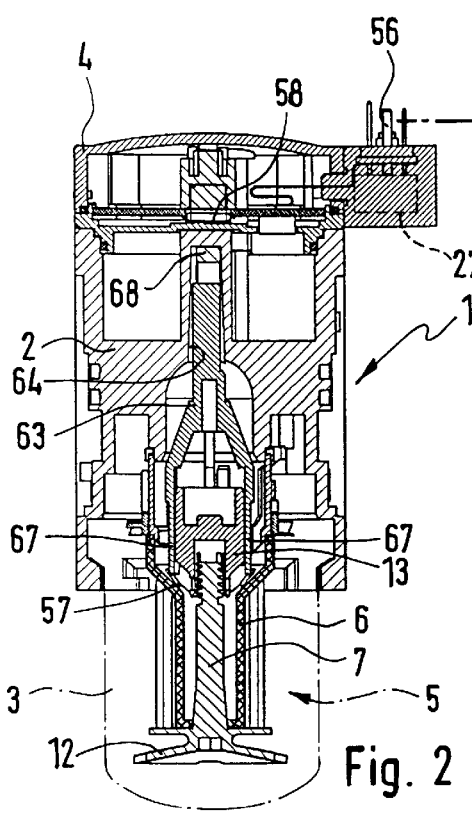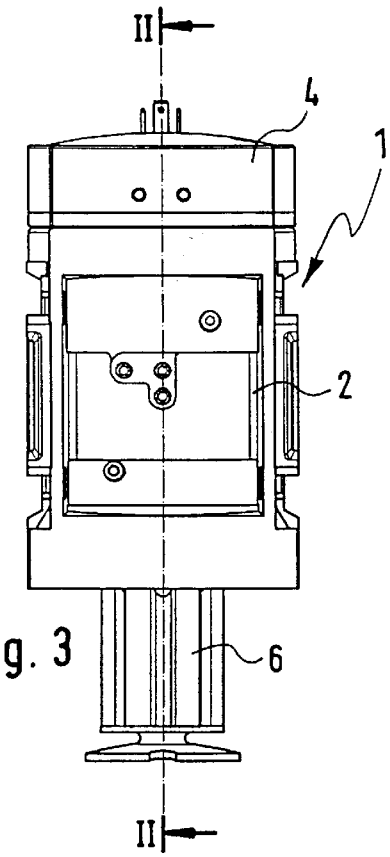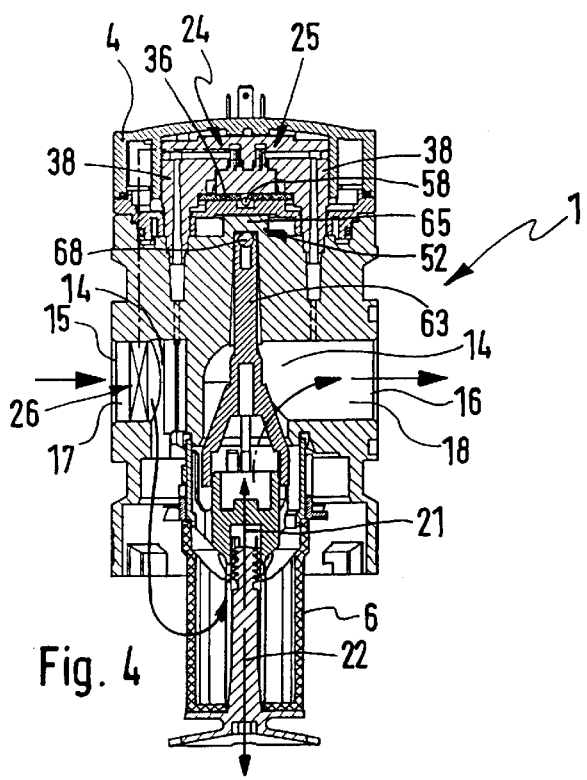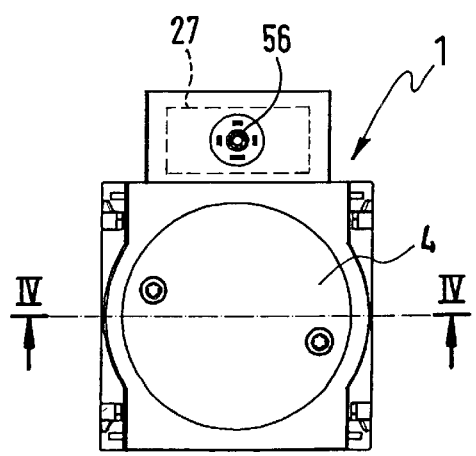

# FILTERING APPARATUS FOR FILTERING COMPRESSED AIR

BACKGROUND OF THE INVENTION

The invention relates to a filter device for the filtration of compressed air comprising a filter means able to be deinstalled for cleaning and/or renewal purposes.

Filter devices of this type are more particularly employed in connection with so-called servicing units which are utilized for processing compressed air within compressed air supply networks. The filter device, which for example may also be combined with a pressure regulator, generally has a principal body adapted to be fitted in the fluid duct arrangement of the compressed air network and on which a cartridge-like filter means is arranged, which cleans the compressed air passing therethrough to clear it of foreign matter.

Problems do occur when machines and equipment connected with the compressed air network are operated despite the filter device having no filter means or a filter means of the wrong type, as a consequence, for instance, of earlier servicing operations. Since the filter device is frequently placed remote from the machines and devices to be operated, visual checking of its actual condition is hardly possible.

SUMMARY OF THE INVENTION

One object of the present invention is to provide a filter with which impairments due to there being the wrong or no filter means fitted may be avoided.

In order to achieve this aim the filter device is fitted with a detection means serving for the detection of the filter means and adapted to produce at least one electrical detection signal dependent on the result of detection. In accordance with requirements such detection means can be so designed that it detects the presence and/or absence of a filter means and/or is designed to recognize the currently installed filter means type, the detect signal in the first mentioned case being a simple yes/no signal and in the latter case being a signal specific to the filter means type. In every case the electrical detect signal, dependent on the result of detection, may be further processed in an optimum fashion in order to help avoiding impairments of the machines and devices connected with the respective compressed air network, there being for instance the possibility of producing a detect signal, when no filter means or the wrong type of filter means is fitted, to prevent putting the connected machines and/or devices into operation.

Further advantageous developments of the invention are defined in the dependent claims.

The detection means will conveniently comprise activating means associated with the filter means and which, when the filter device is installed, cooperate directly or indirectly with sensor means provided on the housing of the filter device for producing a detect signal. The sensor means can for example be designed to be mechanically activated or activated without making contact, there being in the latter case for instance means for optical or magnetic activation. Thus it is possible for the sensor means to comprise at least one magnetic field sensitive sensor, which responds to a permanent magnet, which is caused to move on installation and/or deinstallation of a filter means and is moved by same.

The invention further contemplates a structure, in the case of which the activating means directly cooperate with the housing-mounted sensor means. In order to provide an optimum design of sensor device, it is however possible to provide for indirect actuation by causing the activating means to cooperate with the sensor means by the intermediary of a signal transmission means. The signal transmission means can for example be constituted by a sliding plunger moving on the housing and which is able to be slid in the direction of installation and deinstallation of the filter means and is moved during installation and, respectively, deinstallation of the filter means in relation to the sensor means.

In the case of a design which is more especially simple the activating means are constituted by at least one strike face which acts on the signal transmission means and which is provided on the respective filter means.

In order to produce a detect signal specific to the type of filter means, it is possible for the different filter means types to possess different design)s of activating means. In the case of the above mentioned strike faces it is possible in connection with the filter means of different types to provide a different positioning related to the direction of installation and deinstallation with the result that the associated signal transmission means is displaced different distances in relation to the sensor means in a manner dependent on the type of inserted filter means.

Preferably, an electronic evaluating means is provided for the evaluation of the detect signals produce. It may be provided externally and be connected by way of suitable communication means with the filter device. In the case of a particularly compact arrangement the evaluating means is designed as a direct component of the filter device or as a component of a compressed air servicing unit, to which device belongs.

In the case of an advantageous further development of the filter device means are provided for the recognition of the degree of clogging of the filter means currently in use, on the basis of which the time for the necessary replacement or cleaning of the respective filter means may be set. The filter device is in this case mounted in a principal fluid duct, which it divides into an input flow section associated with an inlet and an output flow section associated with an outlet, the recognition means comprising a pressure differential sensor means responsive to the pressure differential between the input flow section and the output flow section and furthermore a flow rate sensor means responsive to the flow rate through the principal fluid duct. The pressure differential and the flow data found are linked in an electronic evaluating means to yield a condition value relevant for the degree of clogging of the filter means, which value may be compared with predetermined limit values. Unlike recognition means based on the detection of the pressure differential alone, it is possible in this manner to ensure that the critical degree of clogging is detected even during operation of the plant having the filter device, even when different flow rates occur owing to switching on and/or off of loads.

The electronic evaluating means preferably comprises a comparison means, in which a comparison is made between the detected condition value and the predetermined limit values, a means being present if desired which renders it possible to store limit values for at least one filter means type. It is particularly advantageous in this case to have a design, in the case of which limit values may be stored for several different types of filter means in the storage means, a selection means being employed to implement a selection of limit values dependent on the filter means type, in the case of which selection the electrical detect signals, supplied by the detection means, being taken into account.`

The means for the recognition of the degree of clogging preferably furthermore also include an input pressure sensor means responsive to the input pressure value obtaining in the inlet flow section of the principal fluid duct the detected input pressure value being additionally taken into account in the electronic evaluating means for ascertainment of the instantaneous or current condition value with the result that the filter device may be operated in a universal manner and independently from the instantaneously obtaining input pressure value.

In what follows the invention will be described in detail with reference to the accompanying drawings.

BRIEF DESCRIPTION OF THE DRAWINGS

FIG. 2 shows the filter device of FIG. 1 in a longitudinal section on the section line II—II of FIGS. 1 and 3.

FIG. 3 shows a side elevation of the filter device looking in the direction of the arrow III of FIG. 1.

FIG. 4 shows a further longitudinal sectional view of the filter device on the section line IV—IV of FIG. 1 in a section plane perpendicular to the representation of FIG. 2.

FIG. 5 shows a plan view of the filter device looking in the direction of the arrow V of FIG. 1.

DETAILED DESCRIPTION OF THE INVENTION

Figure 1:
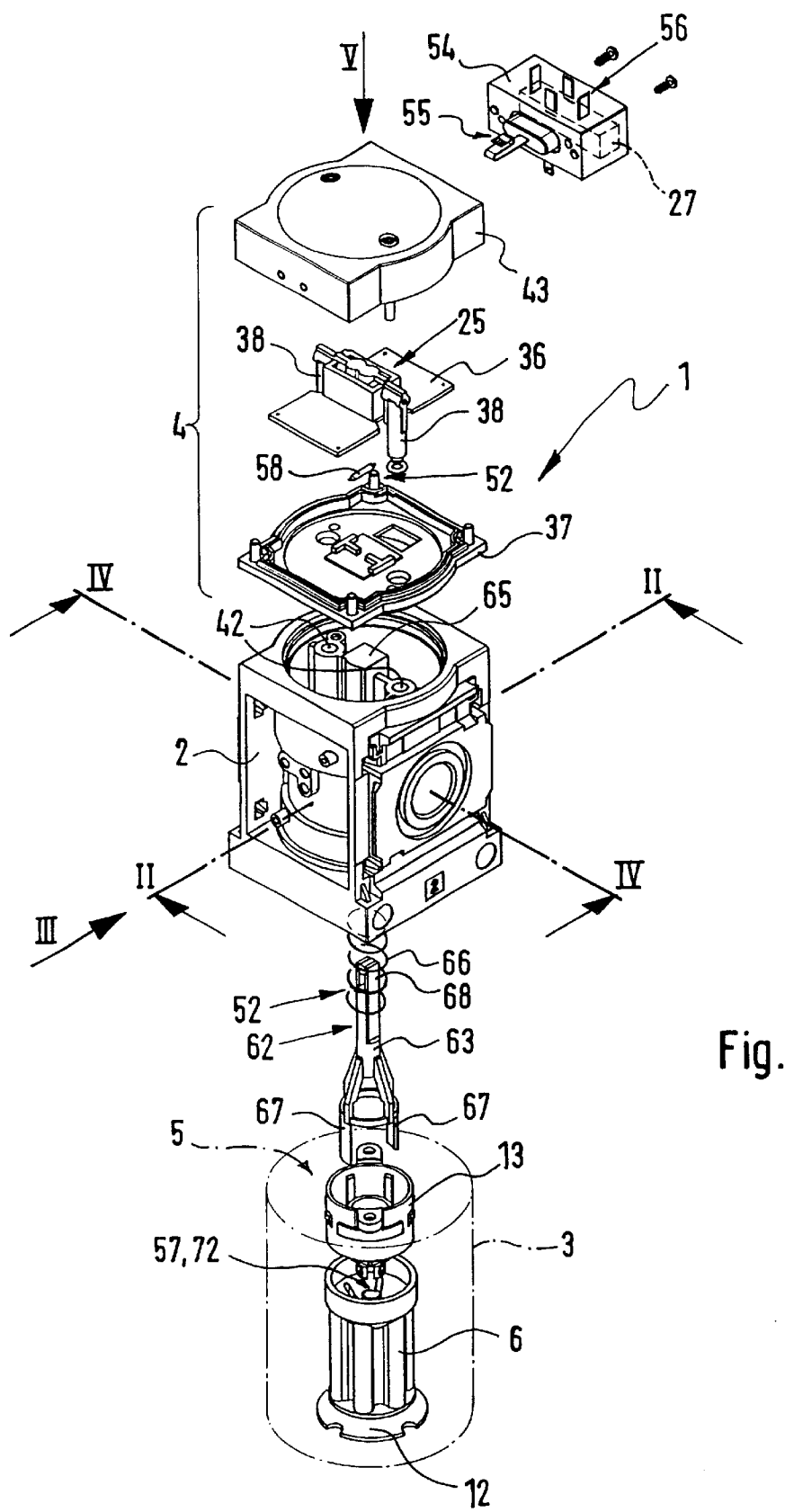
FIG. 1 shows the filter device of the invention in a preferred form of embodiment in a perspective, exploded view.

The filter device generally referenced 1 comprises a housing with a principal body 2, which for instance is cubic, a filter vessel 3 detachably secured to the bottom side thereof in a sealing manner and furthermore a head piece 4 mounted on the top of the principal body 2.

Together with the principal body 2 the filter vessel 3 delimits a filter space 5, in which a removable cartridge-like filter means 6 is received.

The filter means 6, which has a structure similar to a cylindrical tube, is applied to the principal body from below in its axial direction and is detachably secured to it. For attachment use is here made of an attachment screw 7, which is inserted from below through the central cavity 8 in the filter means 6, it acting upward on the filter means 6 by means of a round plate 12, while its top end is screwed into the thread in an attachment part 13 permanently connected with the principal body. In the working embodiment illustrated the latter is attached as a separate component to the principal body 2 and has a sleeve-like form.

The filter device 1 has a principal fluid duct 14 ex-ending through it, which has an inlet 15 and an outlet 16, both of which are provided on the principal body, preferably at opposite outer sides thereof. The inlet 15 and the outlet 16 are provided with connecting means, not illustrated, which render possible a detachable connection with fluid ducts leading to other equipment. The filter device 1 has compressed air flowing through it during operation, which enters by way of the above mentioned fluid ducts at the inlet 15 and leaves by way of the outlet 16.

The filter means 6 is arranged on the principal fluid duct 14 and divides up same into an input flow section 17 associated with the inlet 15 and output flow section 18 associated with the outlet 16. The input flow section 17 extends at the outer periphery of the filter means 6 into the filter space 5, whereas the output flow section 18 is connected with the cavity 8 of the filter means 6. The entering compressed air thus flows through filter means 6 in the interior of the filter space 5 to the outside and leaves again by way of the cavity 8 and the output flow section 18 by way of the outlet. On flowing through the filter means 6 the compressed air is filtered and freed of foreign matter, which is retained in the filter means 6.

The direction of flow could also be reversed. Generally the direction of flow of the air will be dependent on the type of filter means 6 employed.

The filter device 1 may be termed a servicing device serving for preparing the compressed air and which is incorporated in a compressed air distribution network. It may, as illustrated in and described, be used as a stand-alone device. However joint use together with one or more further servicing devices is possible, as for example a regulating device and/or an oiler, such further devices being able to be collected together in a modular manner to constitute a servicing unit. Further servicing devices can be mounted on the outer sides having the inlet 15 and the outlet 16 instead of the above mentioned fluid ducts.

Owing to the retained foreign matter the filter pores of the filter means 6 gradually clog up and the filter means 6 is fouled. In good time before the flow rate of the compressed air passing through the filter means 6 falls to a critical value in terms of quantity per unit time, which is more particularly dependent on the loads connected with the compressed air network, the filter means 6 should be cleaned or replaced by a clean new filter means 6. The deinstallation necessary for this of the filter means 6 is performed by removal of the filter vessel 3 and the attachment screw 7, after which the filter means 6 may be taken off in a downward deinstallation direction 22 coinciding with its longitudinal axis. The following mounting operation is performed in the opposite order, the installation direction 21 being directed upward opposite to the deinstillation direction 22.

Figure 6:
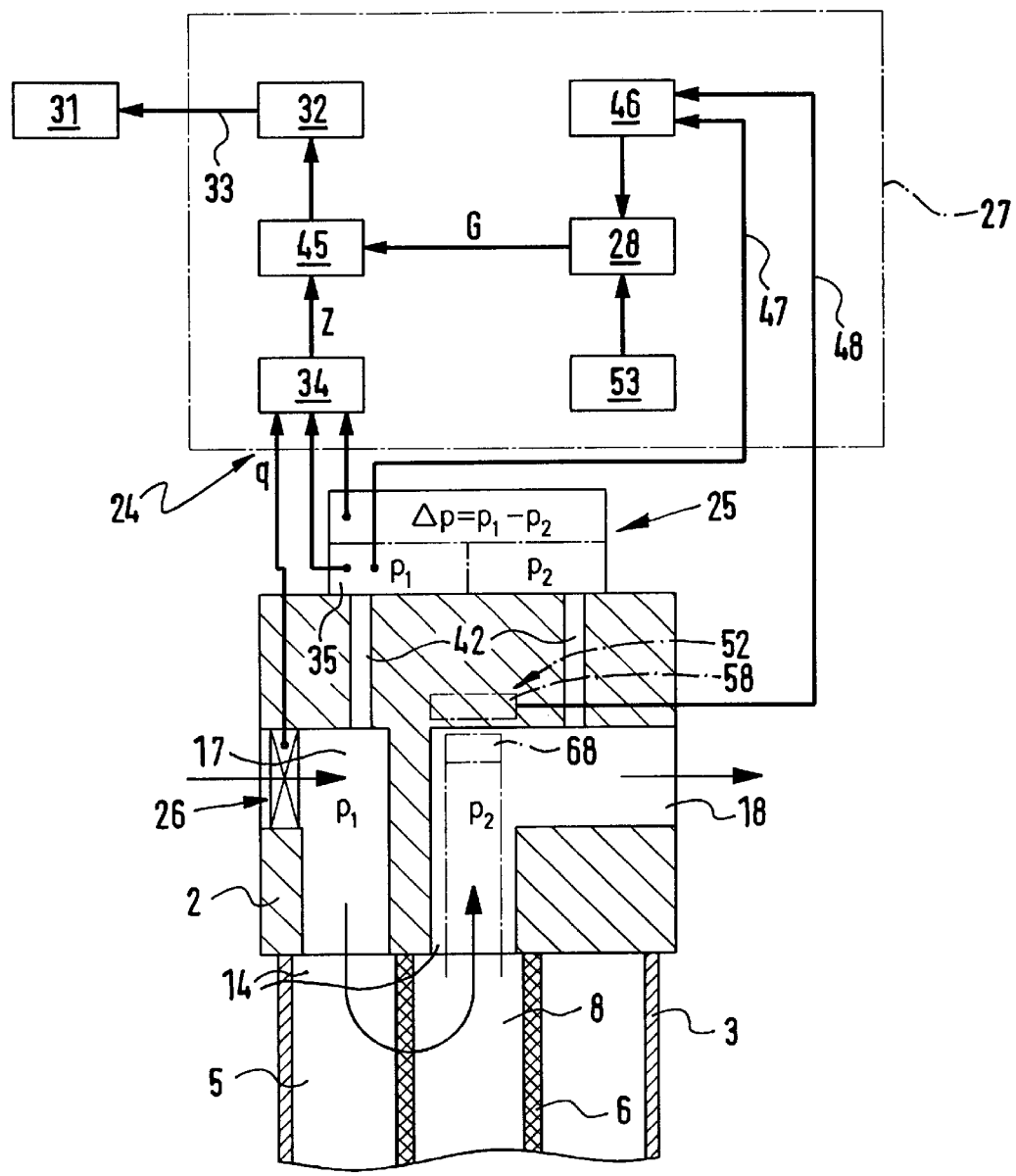
FIG. 6 shows a highly diagrammatic view of the filter device to explain an advantageous design of the electronic evaluating means.

In order to ascertain the point in time suitable for the replacement or cleaning of the filter means 6 the filter device is provided with means for the recognition of the degree of clogging of the filter means 6, which in the following will be termed recognition means 24 for the sake of simplicity. As shown as well in FIG. 6 the will be seen that the recognition means 24 comprise a pressure differential sensor means 25 responsive to the pressure differential Δp between the input flow section 17 and the output flow section 18 of the principal fluid duct 14 and furthermore a rate sensor means 26 responsive to the flow rate in the principal fluid duct 14. Furthermore the recognition means 24 possess an electronic evaluating means 27, in which the detected pressure differential values and the rate values are linked together to give a condition value "Z" relevant for the degree of clogging of the filter means 6, and such value is compared with limit values "G" held in a storage or memory means 28. A warning means 32, also belonging to the electronic evaluating means 27 is able to give a warning about the current condition value as found and/or the reaching or exceeding of the limit values for the respective filter means. The warning can be provided optically and/or acoustically, but however in this case it is provided as an electrical warning signal 33 able to be processed in an electronic control means 31.

The stored limit values are formed on the same basis as the condition values, that is to say including pressure differential and rate values.

The pressure differential sensor means 25 is so designed in the working embodiment that both the input pressure value $p_1$ obtaining in the input flow section and also the output pressure value $P_2$ obtaining in the output flow section 18 are detected and from them the pressure differential $\Delta p = P_1 - P_2$ is found. This pressure differential $\Delta p$ is, like the associated rate value q linked in a gate circuit 34 of the electronic evaluating means 27 to give a current condition value "Z", the linking also preferably taking into account the input pressure value $p_1$ as found, in an independent form. The function of the input pressure sensor means 35 is for the sake of simplicity performed by the pressure differential sensor means 25, even although a separate sensor means could be provided.

In the working embodiment illustrated the pressure differential sensor means 25 is mounted in the interior of the head piece 4. It is seated on a support board 36 preferably in the form of a printed circuit board, which is arranged on the inner side of a floor part 37 of the head piece 4, at which the head piece 4 is mounted on the principal body 2. Flow directing parts 38, having internal fluid ducts, in the pressure differential sensor means 25 extend through the floor part 37 and extend into two connecting ducts 42 in a sealing manner, such ducts 42 extending in the principal body 2, one of the ducts 24 being connected with the input flow section 17 and the other being connected with the output flow section 18. It is in this manner that the pressure signals pass to the pressure differential sensor means 25, which accordingly may advantageously be located outside the principal body 2.

A cover part 43, mounted in a sealing manner on the floor part 37, of the head piece 4 ensures that the pressure differential sensor means 25 is safeguarded.

The flow rate sensor means 26 is in the working example accommodated in the input flow section 17 of the principal fluid duct 14, but might be also placed at some other point in the principal fluid duct 14 or designed in the form of a means separately installed from the filter diameter 1. The integrated structure renders possible keeping to compact dimensions,with the possible complexity of connections.

Figure 7:
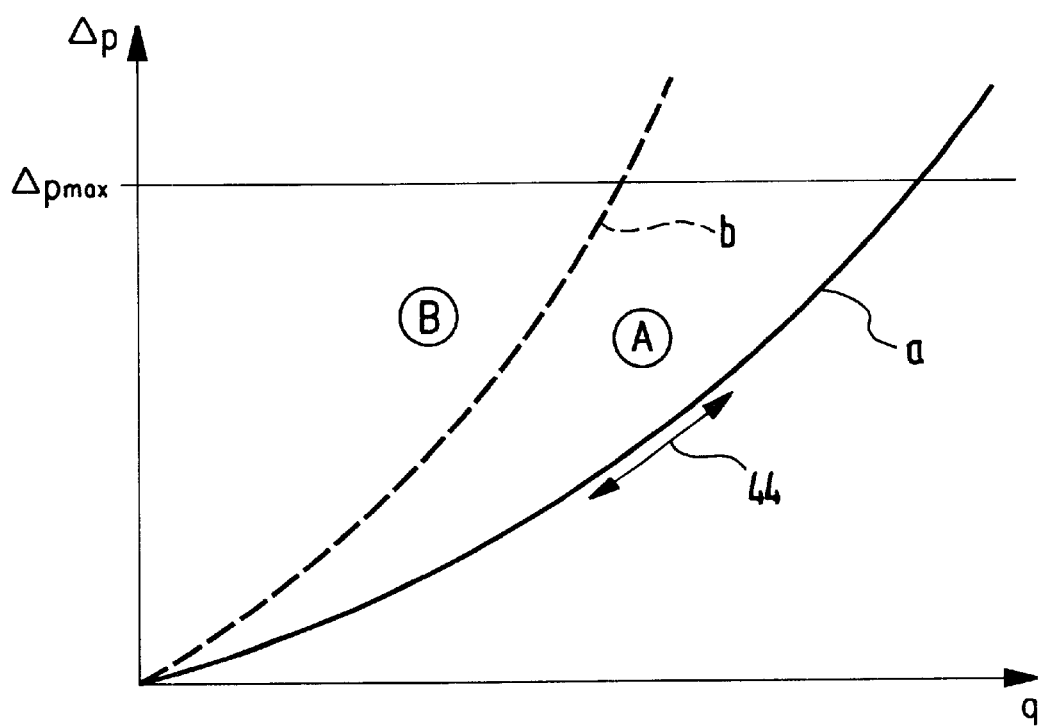
FIG. 7 represents a diagram to indicate the manner of operation of the means serving for detecting the degree of clogging of the filter means, the drop in pressure Δp being plotted against the flow rate q in the case of a filter means for a condition characteristic "a" for the fresh state of a filter means and representing the limit value characteristic "b'" representing the predetermined limit values.

For cases in which the filter device 1 is only designed for one given type of filter means and operation takes place with only one particular input pressure pi, the associated limit values "G" may be stored in the storage means 28 in a limit value characteristic. Such a limit value characteristic "B" is plotted by way of example in FIG. 7 in chained lines and provides permissible pressure differential values $\Delta p$ as a function of the rate of flow q. Furthermore FIG. 7 indicates the condition value characteristic "a" established in the filter means 6 of the respective type when the filter means is not fouled. The condition values "Z" determined in the gate circuit 34 are therefore, when the filter means 6 is clean, on this condition value characteristic, on which they move in a manner dependent on the flow rate as indicated by the double arrow 44.

The evaluating means 27 comprises a comparison means 45, in which the currently found condition value "Z" is compared with the limit values "G" held in the storage means 28. As long as in this case the condition values found are located in the permissible range A—in FIG. 7 this is the range located underneath the limit value characteristic "B"—operation of the filter device 1 is normal, though however there is here a possibility of providing an output signal with respect to the current condition value"Z", with a comparison of the associated limit value or values "G" for checking purpose by way of the warning means 32. It is however more convenient to proceed in such a manner that the warning means 32 provides a warning signal 33 only when the currently found condition value "Z" has reached the limit characteristic "b" or exceeds the non-permitted range B above the limit characteristic "b".

Since for the detection of the degree of clogging both on detection of the current condition value and also within the stored limit values the interdependencies between the pressure differential $\Delta p$ and the current rates q can be taken into account, it is possible to provide extremely reliable indications independently of the operationally set current rate values. If for instance as a limit value only a pressure dependent of the rate were to be provided, then although it might be relevant for a higher volumetric flow, it would be much too high for a lesser volumetric flow so that exceeding the limit value would be recognized much too late. However it may be expedient to provide an additional limit value in the form of a rate dependent maximum pressure differential value $\Delta_{pmax}$, which in all operational states indicates that limit value, at which further operation of the filter means would be inappropriate.

While the filter device 1 in the present case is designed for operation with a variable input pressure $p_1$, the storage means 28 can hold an extensive range of characteristics, which includes a respective limit value characteristic for each or selected input pressures. In such a case the evaluating means 27 is best provided with a selection means 46 with which the correct limit characteristic may be selected in a manner dependent on pressure. The selection dependent on input pressure may be take place manually or, preferably, automatically, the latter case involving derivation by the input pressure sensor means 35 of a first selection signal 47, which may be supplied to the selection means 46.

In a manner dependent on the particular application it is possible for the present filter device to be operated with different types of filter means 6, that is to say with filter means of different overall size, different geometries and different degrees of fineness and the like. The recognition means 24 are consequently so designed that same take different filter types into account on detection of the degree of clogging. This is done in the example by storing limit values for all filter means types suitable for use with the filter device in the storage means 28, such storage preferably being in the form of a set of characteristics, the selection means 46 being so designed that it can be employed to effect a type-specific select on of limit values. For this purpose it is possible for the selection means 46 to be designed for manual operation and to comprise, for example, a switch arrangement and/or a variable resistor arrangement, by means of which the desired preselection may be effected, for example by the manufacturer or by the user.

However the design of the working example is substantially more convenient, in the case of which the type-specific selection is performed using a second electrical selection signal 48, same being produced by detection means 52, which will be described in detail later and which includes means for the recognition of currently installed filter means type.

It will be clear that in connection with the limit values dependent on the type of filter means, input pressure-dependent limit characteristics of the sort described above may also be stored in the storage means 28.

In the working embodiment illustrated the electronic evaluating means 27 lastly comprises an electronic presetting means 53, with which limit values for the respectively fitted filter means may be set in an adaptable fashion in order, in case of need, to provide for adaptation, for instance to suit novel types of filter means.

In principle the evaluating means 24 could be mounted externally of the filter device 1 and be connected by way of suitable communication means with the pressure differential sensor means 25, the flow rate sensor means 26 and the detection means 52. An essentially more compact and more straightforward arrangement is possessed by a working example of the invention, in the case of which the evaluating means 27 is designed in the form of a direct component of the filter device 1. It is located in a communication module 54, preferably detachably mounted on the housing of the filter device 1, and connected by way of a first interface 55 with the housing of the filter device and the electronic components comprised therein and by way of a second interface 56 with an external electronic control means 31. This control means 31 can be a memory programmable control means (SPS), which controls mechanical operations of loads connected with the compressed air network and in which inter alia the warning signals 33 could be taken into account.

The electronic evaluating means 27 could also be a fixed, regular component of the filter device. If the filter device 1 is a modular component of a servicing unit, it would be feasible for the evaluating means 27 to be located at some other position on the servicing unit, for example on or in some other servicing device. Finally it is possible for the evaluating means 27 to also be a component of a stand-alone module of a servicing unit.

The evaluating unit 27 may also be linked for control purposes with electronic components of other servicing devices of a servicing unit. It could in this respect be included in an internal data bus. Furthermore, it is possible for the evaluating means 27 to comprise a field bus station not illustrated in detail, which renders possible communication with the control means 31 using serial signals, an exchange of signals and data in both directions being possible.

The above mentioned detection means 52 of the filter device 1 has, in the embodiment, such a structure that it renders possible the recognition of the currently installed filter means 6 and is able to produce a detect signal dependent on the detected filter means type, which detect signal is passed as a second selection signal 48 to the selection means 46 in the working example. Furthermore, the detection means 52 is able to detect the presence or absence of a filter means on the filter device 1 and here as well to produce at least one electrical detect signal dependent on the result of detection. In this respect it is to be noted that the detection means 52 and the recognition means 24 responsive to the degree of clogging of a filter means 6 do not necessarily have to be present simultaneously, and may be included respectively alone and independently of each other in a filter device 1. One electronic evaluating means 27 is however preferably present even if the said recognition means 24 is not present, which however may be provided in a somewhat "leaner" form as compared with the above mentioned design so that at least one evaluation of the detect signals produced is possible. Furthermore, it is possible for the linking for communication and the placement of the electronic evaluating means 27 together with a detection means 52 to be the same as has been explained in connection with the recognition means 24.

In the working embodiment illustrated the detection means 52 possesses activating means 57 provided on the installed filter means 6 or any filter means to be installed, which activating means 57 cooperate directly or indirectly with sensor means 58 on the housing (at least when the filter means 6 is installed) in order to produce an electrical detect signal which can be utilized. The working example comprises a modification involving indirect cooperation between the activating means 57 and the sensor means 58 by the intermediary of a special signal transmission means 62, whose principal component is a plunger 63 able to be slid in the installation and deinstallation direction 21 and 22 of the filter device 6 in relation to the sensor means 58 fixed on the housing.

The plunger 63 is in the working example mounted on the principal body 2 for sliding motion, the body 2 having for this purpose an elongated plunger receiving slot 64 open toward the filter space 5 and which extends through the output flow section 8 of the principal fluid duct 14. The plunger 63 is inserted into the plunger slot 64 from the filter space 5, the slot being sealed off at its end facing the head piece 4 by a terminating wall 65. It is in this manner that it is ensured that pressure medium flowing in the principal fluid duct is prevented from escaping through the plunger slot 64 without separate sealing means.

In the course of assembly after insertion of the plunger 63 the attachment part 13 is put in place, which prevents the plunger 63 from moving out of position into the filter space 5. By the provision of a return spring means 66 acting between the plunger 63 and the housing of the filter device 1 and preferably bearing against the plunger 63 and the principal body 2, the plunger 63 is biased toward an initial position, which it assumes when the filter means 6 is removed. In the direction toward the filter space 5 it bears against the attachment part 13, one or more drive parts 67 of it axially extending through the part 13 toward the filter space 5. The drive parts 67 may as shown in FIG. 1 be designed in the form of wings.

The sensor means 58 is located in the range of sliding of the plunger 63 and in the working embodiment are adjacent to the terminating wall 65, same being offset past the adjacent end of the plunger slot 64 outside same. They are located in the interior of the head piece 4, and they are fixed to the support 36 plate 36 which may also be fitted with a pressure differential sensor means 25. By means of electrical conductors, not illustrated in detail, the sensor means 58 are connected with the evaluating means 27. In the working embodiment illustrated the sensor means 58 is in the form of a magnetically activated sensor means, as for instance in the form of a so-called reed switch.

Actuating means 68 are provided on the plunger 63, which are entrained on movement of the plunger 63. In the working embodiment illustrated they are in the form of permanent magnet means, which are arranged on the end, adjacent to the head piece 4, of the plunger 63.

In the working embodiment illustrated the activating means 57 are constituted by a strike face 72, which is provided on the end face, facing in the installation direction 21, of the filter means 6. On installation of the filter means 6 the strike face 72 of same will thrust against the drive parts 67 of the plunger 63 and shift same against the force of the return spring means 66 in the plunger slot 64 toward the head piece 4, the permanent magnet actuating means 68 coming closer to the magnetic field sensitive sensor means 58, which will produce an electrical detect signal at the latest on reaching the desired terminal position of the filter means 6. This detect signal may also be employed as a confirmation signal in order to confirm correct installation of a filter means 6 to the control means 6 so that the control means 61 can start operation of loads connected with the network.

As an alternative to the magnetic detection as described other detection measures may be provided without making physical contact, for example optical measures. Furthermore, mechanical cooperation between the plunger 63 and the sensor means would be possible, the means in this case possibly being in the form of a mechanical switch.

In the case of a further possible design, not illustrated either, activating means 57 provided on the filter means 6 directly cooperate with sensor means 58 arranged on the housing without any additional signal transmission means being placed in between.

It would naturally also be possible to so design the arrangement that a detect signal would be produced on the absence of a filter means 6. Furthermore in the same way separate detect signal could be produced when the filter means is removed on the one hand and on the other hand when the filter means is installed, something which in the working example could be effected by having several permanent magnet responsive sensors arranged at different points along the path of displacement of the permanent magnet actuating means 68. A similar aim could be achieved by the installation of a multi-stage mechanical switch or of a plurality of individual switches.

The detection means 52 may, as indicated, be so designed that it specifically recognizes the filter means type which is currently installed. The corresponding detect signal can then be employed both as a confirmation signal pure and simple for the presence or absence of a filter means 6 and also for causing filter type specific measures to be implemented. This detection function may be produced for instance by providing different displacements of the plunger 63 in a manner dependent on the type of filter means inserted and thus practically a signal would be produced which is dependent on the stroke size of the plunger 63.

An extremely simple measure for producing different stroke sizes of the plunger 63 is one in which the strike faces 72 provided on the individual filter means 6 are arranged and/or designed in different manners. Thus it is possible for the strike faces 72 to be differently positioned as related to the direction 21 and 22 of installation and deinstallation and as seen in the installed state of the respective filter means 6, thus with a different distance from the principal body 2. The plunger 63 is then shifted along a shorter or longer distance toward the head piece 4. By using the sensor means 58, which may be composed of several suitably placed sensors or have a multi-stage sensor behavior, it is then possible to distinguish between different types of filter means 6 without difficulty. It would in other words be possible to design the actuating means 68 and the sensor means 58 in the form of any desired position recognition means, it then being possible to resort to an analog displacement measuring system in order to obtain an extremely accurate detection of the position.

The activating means 57 do not necessarily have to be directly mounted on the filter means 6. A different association with the respective filter means 6 would be possible as well, for instance by integration in the attachment screw 7 in connection with filter means 6, which in a manner dependent on type have different overall lengths. It is in this manner that there would be a different depth of screwing in of the attachment screw 7, something which again may be employed for activation of the sensor means. In all cases the inclusion of a signal transmission means 62 does offer the advantage that in the interrogation range there is neither a high degree of moisture nor a gage pressure so that no special protective measure are necessary.

The interrogation as to position of the activating means 57 or, respectively, of the actuating means 72 activated by same may be performed in a large number of different ways but using the same basic principles, only a few possibilities having been described here. Thus it would be possible for instance to provide one or more micro-switches, which are directly operated mechanically or operated by way of a lever. In this case micro switches could be utilized able to be moved out to the side. Moreover, sliding switches could be employed having a number of switching positions equal to the number of filter means 6 to be detected and spring contact switches could utilized in a similar fashion.

If recourse is had to an optical interrogation of the position use could be made of a fork-type photoelectric detector or of triangulation.

Furthermore the interrogation of position can be performed in connection with a plunger 63 but not necessarily at the plunger end, and may take place somewhere along the length of the plunger. Such a modified design is more particularly to be recommended if the return spring means 66 is placed in front of the plunger 63 and bears against its terminal side and the terminal wall 65 so that actuating means 68 provided on the plunger 63 can not come close enough to the sensor means located outside of the terminal wall 65.

Owing to the design features described a filter device may be provided in case of need which automatically indicates the necessary time of inspection so that inspection and cleaning operations are only performed when there is an actual need. For the communication with an external control means it is possible to utilize state of the art communication equipment including infrared or radio means, so that the degree of clogging and, respectively, the length of life of the currently fitted filter means 6 can be found by interrogation from some remote point.

What is claimed is:

1. A filter device for the filtration of compressed air comprising a filter means able to be deinstalled for cleaning and/or renewal purposes, including a detection means serving for the detection of the filter means, wherein said detection means recognizes at least one type of filter means that is installed in said filter device and produces an electrical detect signal specific to the at least one type of filter means dependent on the result of detection.

2. The filter device as claimed in claim 1, wherein the detection means possesses activating means associated with the filter means, which activating means are able to cooperate directly or indirectly with sensor means on the housing for the production of a detect signal when the filter means is installed.

3. The filter device as claimed in claim 2, wherein a mechanically activated sensor means is in the form of one or more mechanical switches.

4. The filter device as claimed in claim 2, wherein a contact-free sensor means is an optically or magnetically activated sensor means.

5. The filter device as claimed in claim 4, wherein the sensor means comprise at least one magnetic field sensitive sensor which is responsive to a permanent magnet moved on installation and/or deinstallation of the filter means.

6. The filter device as claimed in claim 2, wherein on the housing side and on the filter device a signal transmission means is present which is displaced on installation and deinstallation of the filter means owning to the action of the activating means, which transmission means cooperates by means of actuating means on it with the sensor means.

7. The filter device as claimed in claim 6, wherein the signal transmission means possesses a plunger able to be slid in the direction of installation and deinstallation of the filter means in relation to the sensor means.

8. The filter device as claimed in claim 6, wherein the actuating means is designed for contact-free activation of the sensor means in the form of a permanent magnet means.

9. The filter device as claimed in claim 6, wherein the activating means are constituted by at least one strike face associated with the different types of filter means and directly on the filter device, which can act on the signal transmission means.

10. The filter device as claimed in claim 1, wherein the detection means is designed for detection of the presence and/or absence of a filter means.

11. The filter device as claimed in claim 1, wherein said activating means is designed in connection with the different types of filter means and which can cause an actuation of the sensor means which is specific to the filter means.

12. The filter as claimed in claim 9, wherein the strike faces associated with the different types of filter means in installed condition are differently positioned in relation to the direction of installation and deinstallation of the different types of filter means.

13. The filter device as claimed in claim 1, further comprising an electronic evaluating means for the detect signals produced.

14. The filter device as claimed in claim 13, further comprising a principal fluid duct extending between an inlet and an outlet which is divided by the installed filter means into an input flow section and an output flow section, and by means for the recognition of the degree of clogging of the filter means, which comprise a pressure differential sensor means responsive to the pressure differential between input flow section and the output flow section and a flow rate sensor means responsive to the flow rate in the principal fluid duct, the detected pressure differential values and the detected flow rate values being linked in the electronic evaluating means to yield a condition value relevant for the degree of clogging of the filter means and to be compared with preset limit value.

15. The filter device as claimed in claim 14, wherein the evaluating means includes a comparison means for performing a comparison between the detected condition value and the preset limit values.

16. The filter device as claimed in claim 14, wherein the evaluating means comprises a storage means for the storage of at least one limit value associated with the different type of filter means.

17. The filter device as claimed in claim 16, wherein said limit value for a plurality of different type of filter means are stored in the storage means and in that a selection means is present for type-specific selection of limit values taking into account the actual detect signal of the detection means.

18. The filter device as claimed in claim 14, wherein the means for the recognition of the degree of clogging of the filter means comprise an input pressure sensor means responsive to the input pressure value obtaining in the input flow of the principal fluid duct, the detected input pressure value being taken into account in the electronic evaluating means in the ascertainment of the current condition value.

19. The filter device as claimed in claim 13, wherein the evaluating means is designed in the form of a direct component of the filter device or of a compressed air servicing unit comprising the filter device.

20. A filter device for the filtration of compressed air comprising:

a housing, said housing having a principal body and including a principal fluid duct extending having an inlet and an outlet;

a filter means, said filter means selectively coupled to said housing, said filter means positioned between said inlet and said outlet to filter air from said inlet to said outlet;

a detection means said detection means producing at least one electrical detect signal for indicating the installation or removal of said filter means;

an electronic evaluation means, said electronic evaluation means receiving said electrical detect signal;

a recognition means, said recognition means detecting the degree of clogging of the filter means, said recognition means further including a pressure differential sensor, said pressure differential sensor is responsive to a pressure differential between said inlet and said outlet, and a flow sensor means said flow sensor means detecting a flow rate in the principal fluid duct, wherein said detected pressure differential values and detected flow rate value are evaluated by said electronic evaluating means to yield a condition value relevant for the degree of clogging of the filter means; and said electronic evaluating means having a preset limit value, wherein said preset limit value is compared to said condition value to indicate a degree of clogging of said filter.

21. The filter device as claimed in claim 20, wherein the evaluating means includes a comparison means for performing a comparison between the detected condition value and the preset limit values.

22. The filter device as claimed in claim 20, wherein the evaluating means comprises a storage means for the storage of at least one limit value associated with the filter means.

23. The filter device as claimed in claim 22, wherein limit value for a plurality of different filter means are stored in the storage means and in that a selection means is present for selection of different limit values taking into account the actual detect signal of the detection means.

24. The filter device as claimed in claim 20 wherein the means for the recognition of the degree of clogging of the filter means comprise an input pressure sensor means responsive to the input pressure value obtaining in the input flow section of the principal fluid duct, the detected input pressure value being taken into account in the electronic evaluating means in the ascertainment of the current condition value.

* * * * *

UNITED STATES PATENT AND TRADEMARK OFFICE
CERTIFICATE OF CORRECTION

PATENT NO.    : 6,645,277 B1
DATED         : November 11, 2003
INVENTOR(S)   : Franz et al.

It is certified that error appears in the above-identified patent and that said Letters Patent is hereby corrected as shown below:

Column 1,
Line 30, "provide a filter" should read -- provide a filter device --.

Column 3,
Line 62, "duct 14 ex-ending" should read -- duct 14 extending --

Column 5,
Line 50, "pressure pi" should read -- pressure $p_1$ --

Column 6,
Line 53, "type-specific select on of" should read -- type-specific selection of --.

Signed and Sealed this

Eleventh Day of May, 2004

JON W. DUDAS
*Acting Director of the United States Patent and Trademark Office*